(12) United States Patent
Eismark et al.

(10) Patent No.: US 6,935,303 B2
(45) Date of Patent: Aug. 30, 2005

(54) METHOD OF CONTROLLING THE INJECTION OF FLUID INTO AN INTERNAL COMBUSTION ENGINE

(75) Inventors: Jan Eismark, Gothenburg (SE); Arne Andersson, Molnlycke (SE); Anders Hoglund, Fjaras (SE); Bo Svensson, Hisingsbacka (SE)

(73) Assignee: Volvo Tekisk Utveckling AB, Gothenburg (SE)

( * ) Notice: Subject to any disclaimer, the term of this patent is extended or adjusted under 35 U.S.C. 154(b) by 0 days.

(21) Appl. No.: 10/472,890

(22) PCT Filed: Mar. 27, 2002

(86) PCT No.: PCT/SE02/00615
§ 371 (c)(1),
(2), (4) Date: Apr. 9, 2004

(87) PCT Pub. No.: WO02/079623
PCT Pub. Date: Oct. 10, 2002

(65) Prior Publication Data
US 2004/0154580 A1 Aug. 12, 2004

(30) Foreign Application Priority Data
Mar. 29, 2001 (SE) .......................................... 0101135-2

(51) Int. Cl.[7] ............................. F02B 3/12; F02M 45/02
(52) U.S. Cl. ....................................... 123/299; 123/305
(58) Field of Search ................................. 123/299, 300, 123/305, 496

(56) References Cited
U.S. PATENT DOCUMENTS

| | | | | |
|---|---|---|---|---|
| 5,839,275 A | | 11/1998 | Hirota et al. | |
| 5,954,029 A | * | 9/1999 | Peters et al. | 123/446 |
| 6,073,608 A | * | 6/2000 | Krieger et al. | 123/299 |
| 6,082,331 A | * | 7/2000 | Barnes et al. | 123/446 |
| 6,119,959 A | | 9/2000 | Smith, III et al. | |
| 6,505,601 B1 | * | 1/2003 | Jorach et al. | 123/295 |
| 6,526,939 B2 | * | 3/2003 | Reitz et al. | 123/299 |
| 6,659,086 B2 | * | 12/2003 | Rodriguez-Amaya et al. | 123/467 |
| 6,732,705 B2 | * | 5/2004 | Ebelsheiser et al. | 123/299 |

FOREIGN PATENT DOCUMENTS

| | | |
|---|---|---|
| GB | 2 318 388 | 4/1998 |
| WO | WO 00/15959 | 3/2000 |
| WO | WO 01/23717 | 4/2001 |

* cited by examiner

Primary Examiner—Weilun Lo
(74) Attorney, Agent, or Firm—Young & Thompson

(57) ABSTRACT

Method of controlling the injection of a fluid into an internal combustion engine, comprising a piston reciprocating in a cylinder between top and bottom dead center points, and a nozzle arranged in the cylinder. The method includes injecting a fluid with an initial injection pressure into the cylinder, the fluid being ignited, so that the pressure in the cylinder increases, thereby causing the piston to be displaced towards the top dead center point, and effecting at least one injection pause during injection. The injection, immediately after the injection pause, is effected so that the injection pressure has increased in an interval of more than 0 bar and up to 2000 bar relative to an injection pressure prevailing immediately prior to the injection pause, and the injection pause is effected for a duration corresponding to an angle of rotation of an engine crankshaft in the interval 1°–30°.

9 Claims, 4 Drawing Sheets

METHOD OF CONTROLLING THE INJECTION OF FLUID INTO AN INTERNAL COMBUSTION ENGINE

Figures 1, 2:
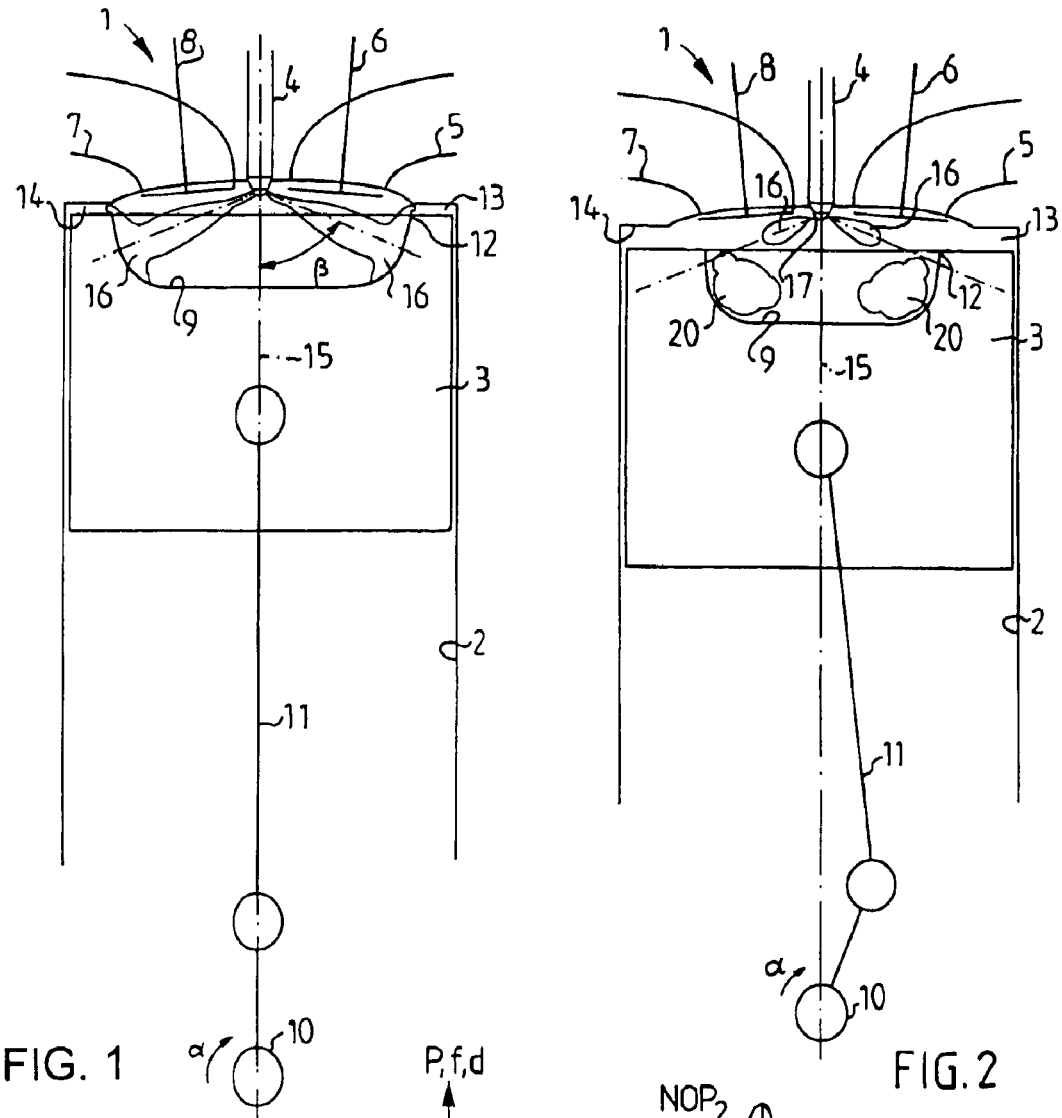

The present invention relates to a method of controlling the injection of a fluid into an internal combustion engine, comprising a piston reciprocating in a cylinder between top and bottom dead center points, and an injection nozzle arranged in the cylinder, said method comprising the steps of effecting an injection of a fluid with an initial injection pressure into the cylinder, said fluid being ignited so that the pressure in the cylinder increases, thus causing the piston to be displaced towards the bottom dead center point in the cylinder, and effecting at least one injection pause during the injection of the fluid.

A combustion process where the fuel is injected directly into the cylinder and is ignited by the elevated temperature and pressure in the cylinder is generally referred to as the direct injection diesel process. When the fuel is injected and is combusted in the cylinder, there is a turbulent mixing of the combustion gases of the burning fuel in the cylinder. The combustion of the fuel/gas mixture in the cylinder generates heat, which increases the gas pressure in the cylinder and thus adds of the net work applied to the piston. Depending on a number of parameters, such as the injection pressure of the fuel, the amount of exhaust returned to the cylinder, the timing of fuel injection and prevailing turbulence and temperature in the cylinder, different efficiency and emission values are obtained.

Conventional internal combustion engines working in accordance with the diesel process have relatively high emission values, such as for soot particles and oxides of nitrogen ($NO_x$). During the expansion there are local areas in the cylinder with air deficiency, resulting in incomplete combustion of fuel injected into the cylinder. This produces emissions in the form of soot particles, which accompany the exhaust during the exhaust stroke.

It is previously known to reduce soot particle formation by injecting the fuel early during or prior to the expansion or work stroke at the same time as one attempts to achieve delay in ignition of the fuel, so that the fuel will have time to be vaporized and mixed sufficiently with gases in the cylinder before the ignition of the fuel takes place. It is also known to return exhaust to the combustion chamber (EGR or Exhaust Gas Recirculation) to reduce the formation of oxides of nitrogen ($NO_x$). There are thus methods for reducing emissions from a conventional engine. These known methods have, however, their limitations, which in extreme cases make the engine inoperable.

When the piston, during the work stroke, moves towards the bottom dead center point, the pressure and temperature drop in the cylinder. It has also been shown that the turbulence or mixing of gases, fuel and soot particles formed will be relatively low in the cylinder and especially in a peripheral area near the cylinder wall during expansion. In sum, this results in a reduction during expansion of oxidation of soot particles formed. These non-oxidated soot particles accompany the engine exhaust during the exhaust stroke.

It has been shown that an increasing pressure during the fuel injection reduces both $NO_x$-formation and soot formation. The reasoning is that a high injection pressure in the fuel when the injection valve opens, gives rise to problems with increased $NO_x$-formation and therefore a low opening pressure is desired. A high pressure at the end of the injection, however, makes the soot oxidation more effective. Thus, advantages are obtained with a low injection pressure at the beginning of the injection and a higher injection pressure at the end of the injection.

Oxides of nitrogen are formed at elevated combustion temperatures. In order to reduce the combustion temperature and thus the formation of $NO_x$, exhaust can be recirculate to the combustion chamber. There are, however, states, for example when the accelerator pedal is forcefully depressed, when it is not possible to recycle sufficient exhaust to the combustion chamber. The result is that $NO_x$-emissions increase.

By EP-A2-0 911 511 it is previously known to divide a fuel injection at constant pressure into a plurality of segments for the purpose of obtaining low emissions of $NO_x$ and soot.

A problem with traditional fuel pumps is that the injection pressure during the injection process is quite dependent on engine rpm and the amount of fuel which is to be injected during the injection process. A large amount of injected fuel and/or high engine rpm increases the injection pressure during the injection process. Conversely, a small amount of injected fuel and/or a low engine rpm will reduce the injection pressure. This means that an increasing pressure during the injection cannot be achieved when the engine is operating at partial load and at low load or at low rpm, and thus the above effects for reducing formation of $NO_x$ and soot will not be realized.

A first purpose of the present invention is to control the fuel injection into an internal combustion engine so that the above mentioned disadvantages of the prior art are avoided and so that $NO_x$ and soot particle contents in the engine exhaust will be as low as possible.

A second purpose of the present invention is to increase the oxidation of soot particles formed in the cylinder to thereby reduce the number of soot particles in the engine exhaust.

A third purpose of the present invention is to reduce the amount of recycled exhaust (EGR) needed to obtain a certain $NO_x$ level.

A fourth purpose of the present invention is to be able to maintain a high final injection pressure for a fluid injected into the engine at all operating states for the engine.

This is obtained by a method of the type described by way of introduction in which the injection of the fluid, immediately after the injection pause, is carried out so that the initial injection pressure is increased in an interval of more than 0 bar and up to 2000 bar relative to an injection pressure prevailing immediately prior to the injection pause and that the injection pause is effected for a duration corresponding to an angle of rotation of a crankshaft arranged in the engine, in the interval of more than 0° and up to 30°, preferably in the interval 1°–20°.

By having at least one injection pause, the subsequent injection will bring fuel, gas and soot particles to areas where a turbulent or mixing movement has stopped, to once again circulate and mix, thereby enabling and accelerating the oxidation of the soot particles by injecting the fluid immediately after the injection pause, so that the initial injection pressure is increased in a range of more than 0 bar up to 2000 bar relative to an injection pressure prevailing immediately prior to the preceding injection pause, the hot combustion gases in the cylinder will be remixed and cooled so that the formation of $NO_x$ will be reduced at the same time as soot particles are oxidated. Especially good results as regards low $NO_x$-formation and high soot oxidation are obtained if the injection pause has a duration corresponding to an engine crankshaft turning angle in the range of more than 0° up to 30°, preferably in the interval 1°–20°.

In one embodiment of the invention, an injection valve is used which is provided with an injection needle, designed to cooperate with at least one injection opening arranged in an injection nozzle, said injection needle being controlled by a fluid pressure generated by a high pressure generated by a high-pressure pump, said fluid pressure being in turn controlled by a spill valve arranged in the injection valve, said spill valve being openable to reduce the pressure in the injection valve in varying degrees, depending on the selected duration of the injection pause and the selected size of the next initial injection pressure. The injection needle can also be opened and closed by a control arrangement independent of the generated fluid pressure.

By making a pause in the injection (with the aid of the above mentioned control arrangement for the injection needle) with such an injection valve, even in those operating conditions which cause a small amount of injected fuel and/or a low rpm, the desired pressure increase in the fluid during the injection process can be obtained. In order to make possible said injection pause, the injection needle of the injection valve is controlled in such a manner that the injection needle is closed one or more times during the injection process. When the injection needle is closed during the injection process and an injection pause is taking place, the high-pressure pump continues to rapidly build up fluid pressure in the injection valve. When the injection valve again opens after the injection pause, the fluid will be injected into the cylinder at an elevated injection pressure, compared to the case where an injection pause had not taken place.

Figure 3:
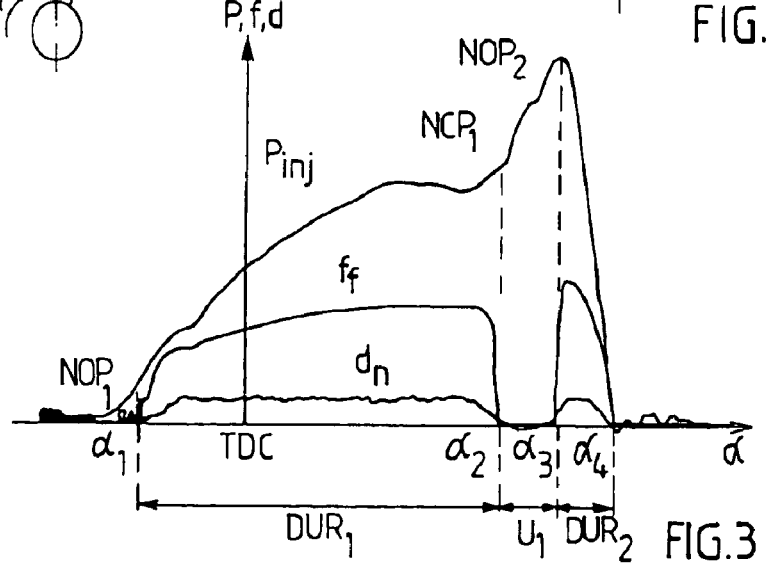
Figure 4:
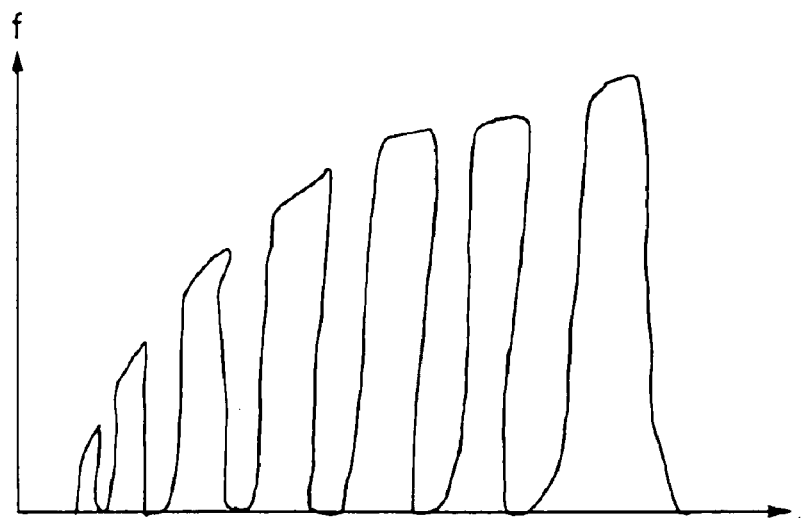
Figure 5:
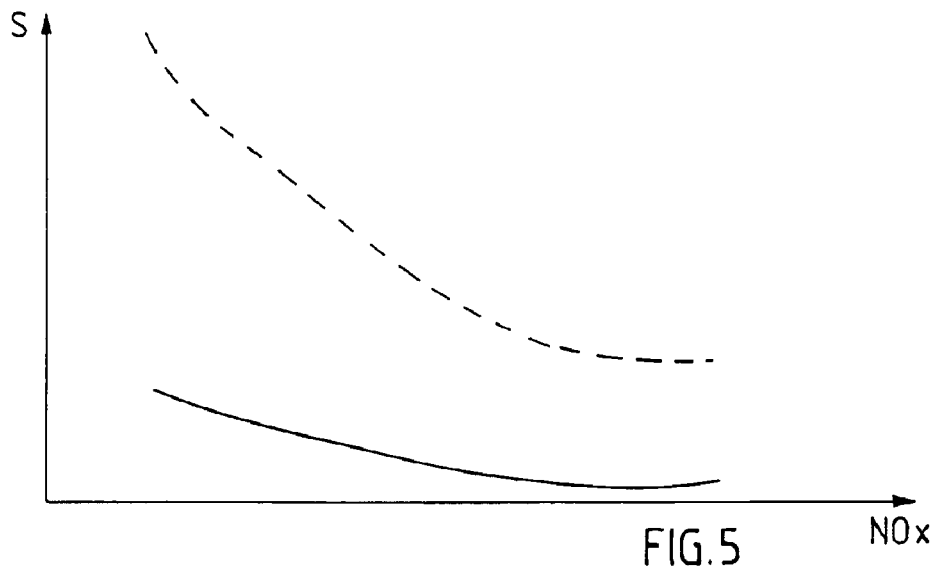
Figure 7:
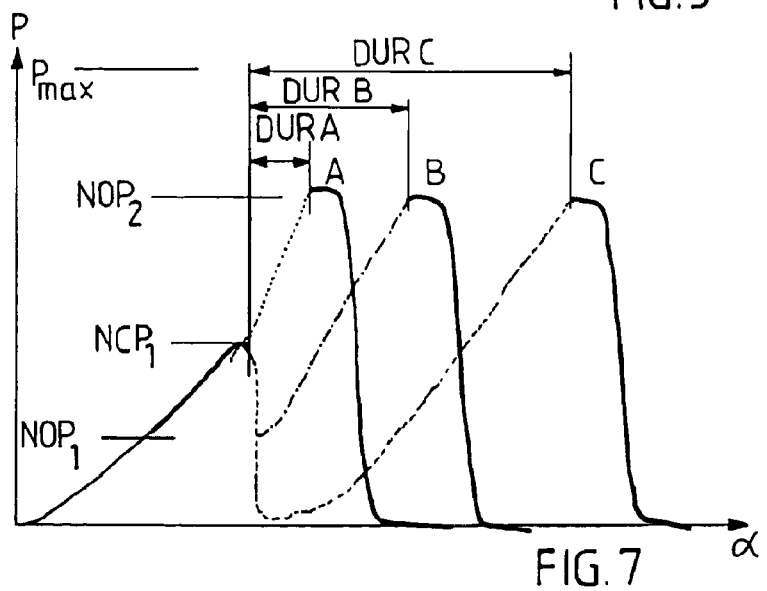
Figure 6:
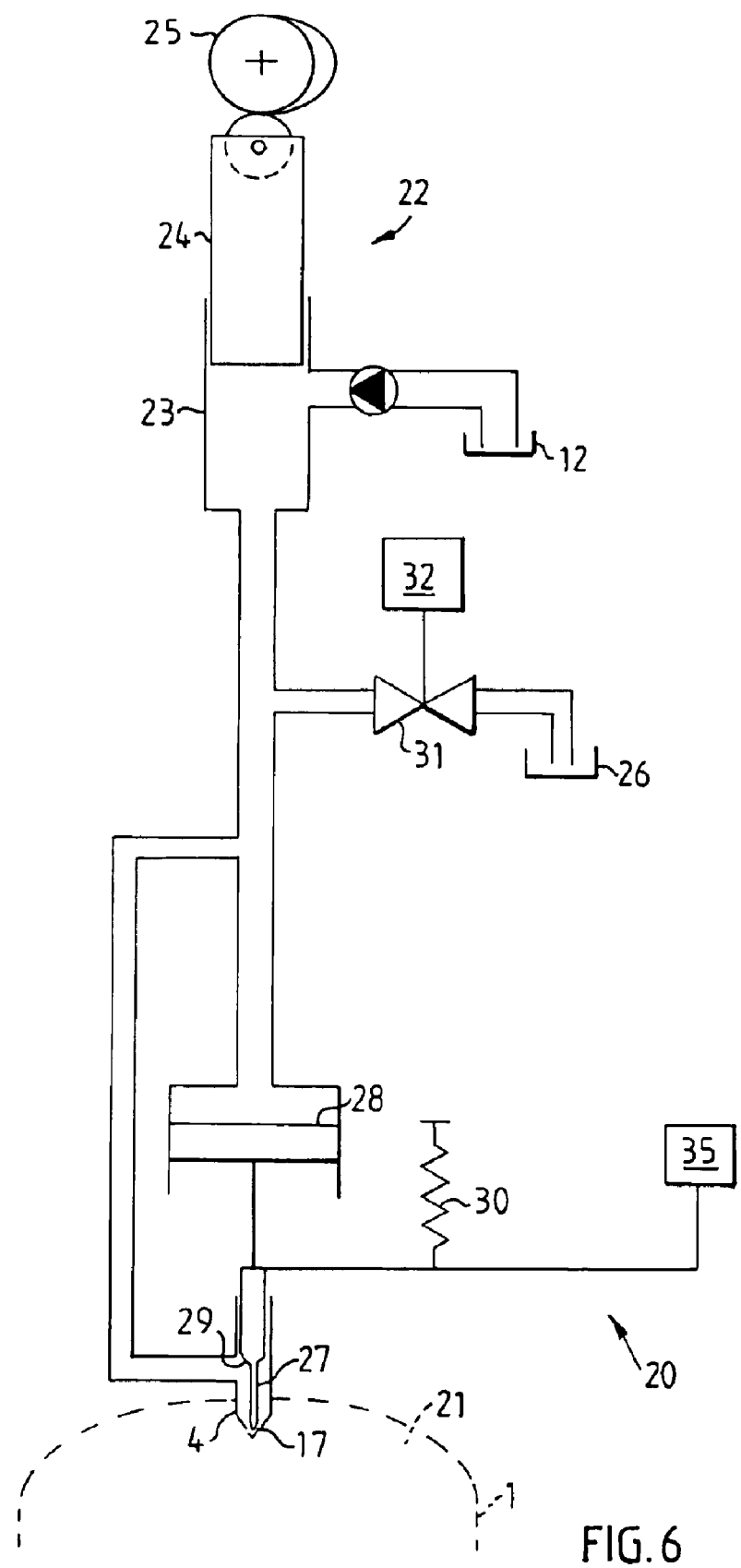
Figure 8:
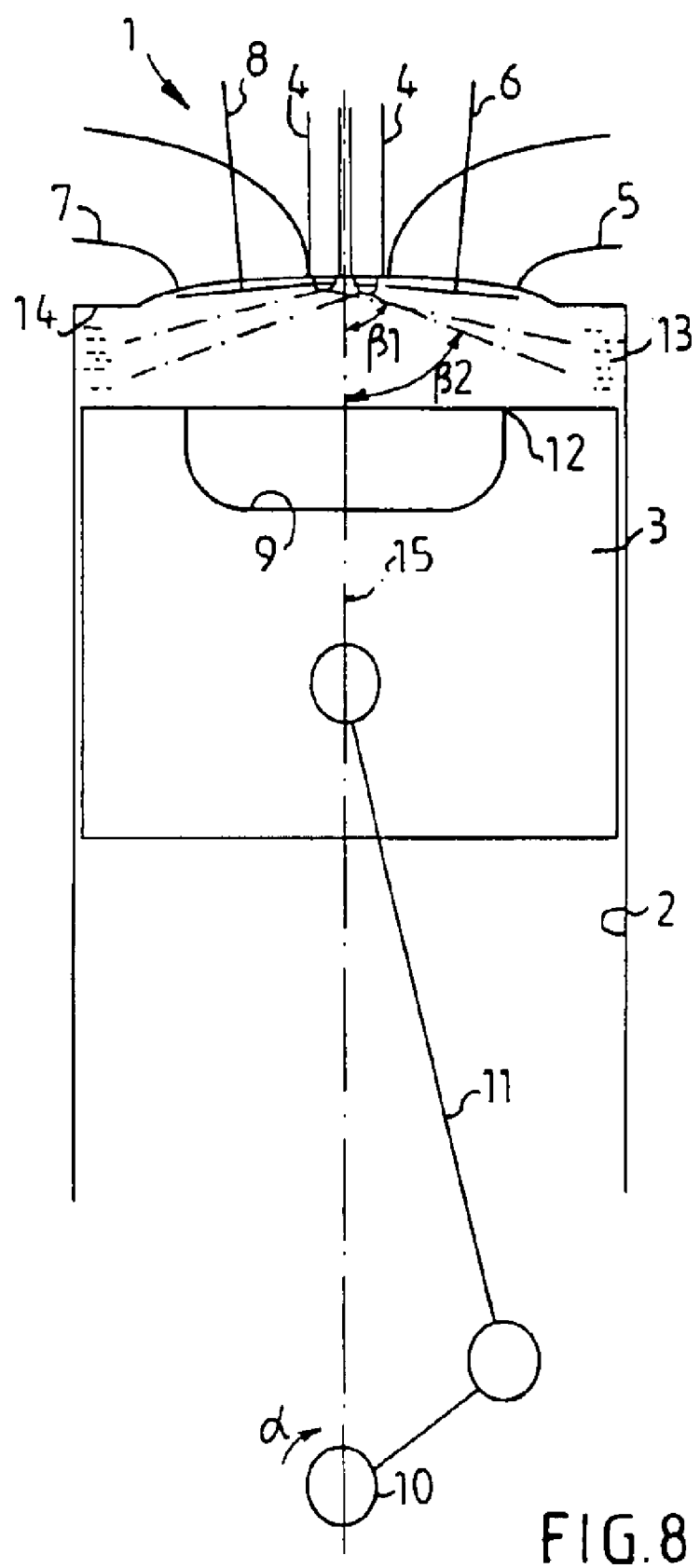

The invention will be described in more detail below with the aid of examples shown in the accompanying drawings, of which FIG. 1 is a schematic view of an internal combustion engine, in which a fluid is injected into a cylinder in accordance with the invention, FIG. 2 is a schematic view of the internal combustion engine of FIG. 1, in which an injection takes place after an injection pause, FIG. 3 is a diagram showing the injection pressure, the fluid flow and the lift height of an injection needle, as a function of engine crankshaft rotational angle, FIG. 4 shows the fluid flow as a function of engine crankshaft rotational angle, FIG. 5 shows the soot particle content as a function of $NO_x$-content in the engine exhaust, FIG. 6 is a schematic view of an injection valve with a force-controlled injection needle, FIG. 7 shows how the injection needle can be controlled to vary the injection pause and the opening pressure for an injection, and FIG. 8 is a schematic view of an internal combustion engine in which the injection of a fluid can be performed at various cone angles.

FIG. 1 is a schematic view of an internal combustion engine 1, in which injection of a fluid, such as diesel fuel, is effected according to the invention. The engine 1 comprises a piston 3 reciprocating in a cylinder 2 between an upper and a lower dead center point and an injection nozzle 4 arranged in the cylinder 2. An intake conduit 5 with a cooperating intake valve 6 leads into the cylinder 2 and an exhaust conduit 7 with a cooperating exhaust valve 8 leads out of the cylinder 2. A depression 9 in the top of the piston 3 forms a combustion chamber. The piston 3 in the example shown in FIG. 1 is coupled to a crankshaft 10 via a connecting rod 11. It is, however, possible to employ the invention in an engine 1 without a connecting rod 11.

As can be seen in FIG. 1, the piston 3 is at top dead center when the fluid is injected into the cylinder 2. The piston 3 can, however, be before or after top dead center when the fluid starts to be injected into the cylinder 2. Preferably, the entire amount of fluid is injected directly into the depression 9 formed in the piston 3, with at least one injection pause $U_i$. This means that fluid sprays 16, 20 are directed directly at or slightly below the edge 12, in principle during the entire injection sequence. The cone angle β is in this case the angle formed between the fluid sprays 16 emitted from the injection nozzle 4 and the centerline 15 of the cylinder 2. The cone angle β must also be selected so that the fluid during injection is substantially injected into the depression 9 in the piston 3, so that fluid does not flow over the edge 12 of the depression and reach the peripheral area 13 of the cylinder 2. In FIGS. 1 and 2, only two fluid sprays 16 are shown coming from the injection nozzle 4, but in practice a plurality of holes 17 are arranged in the injection nozzle 4 so that a cone or umbrella is formed of the fluid sprays 16 injected through the injection nozzle 4. At the same time as fluid is injected into the cylinder 2, a portion of the fluid is mixed with gas drawn into the cylinder 2, consisting of air and possibly exhaust recirculated to the cylinder 2, which has been compressed and thus heated during the compression. A portion of the fluid mixed with the gas will be ignited and combust due to the high temperature in the cylinder 2.

If the portion of the fluid, which has been mixed with the gas in the cylinder 2, burns with an oxygen deficit, soot particles can be formed during combustion. In this context a lambda value for the gas/fluid mixture is defined. Another name for the lambda value is the excess air coefficient, and is defined as the actual quantity of air supplied divided by the theoretical quantity of air necessary for complete combustion. If the lambda coefficient is greater than 1, the gas/fluid mixture is lean, and if the lambda coefficient is less than 1, the gas/fluid mixture is rich. There is an incomplete combustion of the gas/fluid mixture when it is rich, making it possible for soot particles to be formed. In order to reduce the formation of soot particles as much as possible, one strives after a mixture of fluid and gas with a lambda coefficient which is equal to or greater than 1. In an internal combustion engine where fluid is injected directly into the cylinder and is ignited by the heat developed during the compression, such as in a diesel engine, there is often a mixture-controlled combustion of the fluid, which means that the fluid during the injection combusts in a stoichiometric band. In an area adjacent to the stoichiometric band, where the fluid/gas mixture is rich, soot particles can be formed during combustion.

In order to create the preconditions for increased turbulence and mixing of oxygen and soot particles in the cylinder 2, according to the invention an injection pause $U_1$ is made when the piston 3 is moving in the direction towards the bottom dead center in the cylinder 2. Such an injection pause $U_1$ takes place when no fluid is injected into the cylinder 2 when the piston is in the position shown in FIG. 2. The fluid 20 injected during the first injection has in this stage at least partially been ignited by the compression heat generated in the cylinder 2. The fluid therefore burns, thereby further increasing the pressure in the cylinder 2, so that the piston 3 is forced downwards towards the bottom dead center.

FIG. 2 shows how an injection of the fluid is effected immediately prior to a first injection pause $U_1$. The combustion of the fluid 20 injected prior to the injection pause $U_1$ continues, but at reduced intensity due to reduced turbulence and mixing in the cylinder 2. The fluid 16 injected after the pause causes fluid, gas and soot particles in the region where a turbulent or mixing movement has ceased or been appreciably reduced, to once again be caused to circulate and mix or to be circulated and mixed to a greater degree, making possible and/or accelerating the oxidation of the remaining soot particles.

Preferably, the initial injection pressure $NOP_1$ is set at a relatively low level, so that the $NO_x$-formation will be low. If the initial injection pressure is too high, too much mixing energy is introduced, so that the combustion takes place too rapidly and for too long a period of time, with too much fuel. This increases the combustion temperature and thus the $NO_x$-emissions.

It has proved advantageous if the initial injection pressure $NOP_2$ of the fluid immediately after the injection pause is increased in an interval of more than 0 bar up to 2000 bar relative to the injection pressure $NCP_1$ prevailing immediately prior to the injection pause. It has also proved advantageous if the injection pause $U_1$ lasts a period corresponding to a rotational angle $\alpha$ of the engine crankshaft 10 in the interval of more than 0° up to 30°, preferably in the interval 1°–20°.

The total injection process of the fluid, with one or more injection pauses $U_i$, is disposed in an interval of 40° prior to top dead center to 60° after top dead center with respect to the rotational angle $\alpha$ of the crankshaft 10, preferably in the interval 20° prior to top dead center to 40° after top dead center. The injection pressures of the fluid, NOP, NCP (opening pressure and closing pressure, respectively) are preferably controlled within an interval which is greater than the compression pressure in the cylinder up to 3000 bar.

If a plurality of injection pauses $U_i$ are to be effected, one after the other, during one injection process, the fluid will be injected at a plurality of occasions of short duration during each occasion. This means that the pressure during a very short period of time will be injected as a pulse into the cylinder 2. At the same time, the initial injection pressure NOP will increase for the fluid for each partial injection occasion. The short duration and the high pressure results in high impulse and high mixing. By making the piston 3, the depression 9, the cylinder 2 and the cylinder head 14 in a suitable manner, and making the holes 17 in the injection nozzle 4 to which the fluid is to be injected, the regions with a rich fuel/gas mixture arising during and after the first injection can be controlled so that these regions will be affected by the fluid injected after the first injection pause $U_1$. Even the initial injection pressure $NOP_1$ at the first fluid injection and the point of time for the beginning of the first injection are parameters which affect the placement of said region in the cylinder 2 at the point in time for subsequent injection(s).

FIG. 3 shows curves for injection pressure $P_{inj}$, fluid flow $f_f$ and lift height $d_n$ of an injection needle, as a function of the rotational angle $\alpha$ of an engine crankshaft. A first injection is initiated according to the example shown at crankshaft angle $\alpha_1$ prior to top dead center, TDC. The fluid pressure is then $NOP_1$. The first injection takes place for a duration $DUR_1$. At crankshaft angle $\alpha_2$, the needle of the injection valve closes, as can be seen from the curve $d_n$. The fluid pressure at this point is $NCP_1$. When the needle of the injection valve is closed, there is an injection pause $U_1$, as is evident from the flow curve $f_f$. No fluid flows at this time from the injection valve. The injection pause lasts for the time period $U_1$, whereupon a second injection of fluid is initiated at crankshaft angle $\alpha_3$. During the injection pause $U_1$, the fluid pressure continues to build up inside the injection valve, whereupon the injection needle then opens at crankshaft angle $\alpha_3$ and the fluid has obtained a pressure $NOP_2$, which is greater than the closing pressure $NCP_1$ at crankshaft angle $\alpha_2$. At crankshaft angle $\alpha_4$ the injection process ends by the injection needle of the injection valve closing. The sequence in FIG. 3 can be increased by having a plurality of injection pauses.

The injection sequence described in FIG. 3 can be achieved with an injection valve of unit injector type, which will be described in more detail in connection with FIG. 6 below.

FIG. 4 shows the fluid flow f as a function of the rotational angle $\alpha$ of an engine crankshaft 10. As can be seen from the curve in FIG. 4, a plurality of injection pauses $U_i$ are made during the injection sequence. In this manner, the injection sequence will be fragmented. After each injection pause $U_i$, the opening pressure $NOP_{i+1}$ is greater than the closing pressure $NCP_i$ prevailing prior to the injection pause $U_i$. The increasing injection pressure means that an increased amount of fluid will have time to be injected during a given period for each new partial injection, as shown in FIG. 4. As was mentioned in the description introduction, a problem with traditional fuel pumps is that the injection pressure during the injection sequence is strongly dependent on engine rpm and the amount of fuel which is to be injected during the injection sequence. By making a plurality of pauses in the injection, operating states with a small amount of injected fuel and/or low rpm will have the desired pressure increase of the fluid during the injection sequence.

FIG. 5 shows the soot particle content as a function of the $NO_x$-content in the engine exhaust. The dashed curve represents the soot particle content as a function of the $NO_x$-content of a known internal combustion engine and the solid curve relates to the soot particle content as a function of the $NO_x$-content in an internal combustion engine, in which the fluid injection is controlled by a process according to the present invention. As can be seen in FIG. 5, the soot particle content at a given $NO_x$-content of the engine exhaust will be significantly lower if the fluid injection is controlled by a process according to the present invention.

FIG. 6 shows schematically an injection valve 20 arranged to inject a partial volume of the compressed fuel in an combustion changer 21 in an internal combustion engine 1. A high-pressure pump 22 is connected to the injection valve 20. The high-pressure pump 22 comprises a plunger 24 reciprocating in a cylindrical portion 23, said plunger compressing the fluid by applying a force to the plunger 24 by means of a camshaft 25. The fluid is supplied to the cylinder portion 23 from a tank 26.

The injection valve 20 comprises an injection needle 27, designed to cooperate with at least one injection opening 17 in the injection nozzle 4 of the injection valve 20. The injection needle 27 is provided with first and second surfaces 28, 29 receiving pressure from the fluid. A resilient element 30, such as a needle spring, presses the injection needle 27 towards the injection openings 17. If the force from the fuel pressure, acting on the second pressure-receiving surface 29 is greater than the sum of the force from the fluid pressure acting on the first pressure-receiving surface 28 and the force from the resilient element 30, the injection needle 27 will open, whereupon fuel will be injected into the combustion chamber 21, The injection needle 27 is affected by a spill valve 31, coupled to a control unit 32. Furthermore, the injection needle 27 is arranged in cooperation with an arrangement for forced closing of the injection needle. This arrangement is designated 35 in FIG. 6. The arrangement 35 makes it possible to open and close the injection needle 27 regardless of the pressure from the plunger 24 and/or the needle spring 30, even at pressures exceeding the normal opening/closing pressure of the needle spring. It should also be mentioned that the basic shape of the injection sequence which is fragmented, is controlled by the diameter of the plunger 24, the speed of the plunger 24 (i.e. how the camshaft/rocker arm 25 is designed) and the total effective hole area as well as internal leakage from the high-pressure side to the low-pressure side of the injection valve 20.

FIG. 7 shows which functions are obtained with the control arrangement 35. FIG. 7 shows three different injection sequences, each having its own pressure sequence A, B and C, all of which have the same injection pressure $NOP_2$, but where the injection pause between the injection pressure $NCP_1$ immediately prior to the injection pause (only one in FIG. 7) and the initial injection pressure $NOP_2$ immediately after the injection pause are different, depending on how the spill valve 31 and the injection needle 27 are controlled. Please note that an injection system has a maximum possible injection pressure $P_{max}$. FIG. 7 illustrates the possibility of keeping the injection needle 27 closed until a certain predetermined injection pressure has been built up. In FIG. 7, the predetermined pressure levels are $NOP_1$ and $NOP_2$. The injection pause can be freely varied.

In the injection sequence A (see FIG. 7), the spill valve 31 (see FIG. 6) is closed the whole time. When $NOP_1$ has been reached in the cylinder 23, the injection needle 27 is pressed back and fluid is thus sprayed into the combustion chamber 21. The injection needle 27 is forcibly closed with the aid of the control arrangement 35 at the pressure $NCP_1$ and the build-up of the injection pressure to the predetermined pressure level $NOP_2$ is waited for. When the pressure level $NOP_2$ has been reached, the injection needle opens and the next charge of fluid is sprayed in. The injection pause will be DUR A.

In the injection sequence B (see FIG. 7), the pressure sequence is repeated initially as regards $NOP_1$, $NCP_1$ and the spill valve 31 (see the injection sequence A). After $NCP_1$ has been reached, the spill valve 31 is opened and closed to obtain a partial pressure reduction in the system. When the spill valve 31 has been closed, the injection needle 27 closes and the build-up of the injection pressure to the predetermined pressure level $NOP_2$ is waited for. When the pressure level $NOP_2$ has been reached, the injection needle 27 is opened and the next charge of fluid is injected. The injection pause will be DUR B.

In the injection sequence C (see FIG. 7), the pressure sequence is repeated initially as regards $NOP_1$, $NCP_1$ and the spill valve 31 (see the injection sequence A). When $NCP_1$ has been reached, the spill valve 31 opens and the pressure drops to a minimum, whereupon the spill valve 31 is closed. At the same time as the spill valve 31 is closed, the injection needle 27 closes and is kept closed until the level of the initial injection pressure $NOP_2$ has been reached. When the pressure level $NOP_2$ has been reached, the injection needle 27 is opened and the next charge of fluid is injected. The injection pause will here be DUR C. Even longer injection pauses are conceivable by keeping the spill valve 31 open for a longer period of time during the injection pause so that the beginning of the pressure build-up is displaced forward in time. Thus, the timing for when a certain injection will occur can be controlled. In FIG. 7, the injection pressures $NOP_1$ and $NOP_2$ have been chosen at a certain level. It is, of course, also possible to select other levels for the injection pressures by keeping the injection needle 27 closed for varying periods of time and thus achieve different pressure build-up curves. It is also possible to inject the fluid with more than one injection pause, as shown for example in FIG. 4.

FIG. 8 shows an alternative embodiment of the invention where two injection nozzles are arranged in the cylinder 2. This makes it possible for the fluid during a first and subsequent injection to be injected at first and second cone angles $\beta1$, $\beta2$, which are different. The first cone angle $\beta1$, at which the fluid is injected during the first injection, is preferably selected as the previously described cone angle $\beta$. Preferably, the second cone angle $\beta2$, at which the fluid is injected during the subsequent injections, is selected so that areas of rich fluid/gas mixture are reached and mixed by the fluid injected during the subsequent injections.

An additional possibility of varying the cone angles for the partial injections is to arrange a single injection nozzle with variable spreader geometry to create two different angles $\beta$. This is known technology per se.

The process for controlling the fuel injection of an internal combustion engine 1 according to the present invention can be applied in all operational modes of the engine 1. Preferably, the injection is controlled so that the injection pause is only effected when excessive amounts of soot arise during the combustion of the fluid in the cylinder 2. It is also possible that the injection pauses only be carried out when air deficiency can be expected, as when operating the engine 1 at high altitude or when operating engine at elevated surrounding temperature when the air is thin, i.e. when the air has low density, which means that the amount of air taken into the cylinder will contain fewer oxygen molecules per volume unit drawn in. This also occurs during transient sequences, such as opening of the throttle. If the engine is provided with all exhaust-driven turbo, the turbo will react slowly when the throttle is open, with the result being that relatively little air will be introduced into the cylinder 2, which means that regions with rich fluid/gas mixture will be formed in the cylinder 2, thereby increasing the formation of soot. The injection pauses with subsequent fluid injections, executed in accordance with the present process, will then see to it that there is a satisfactory oxidation of soot particles. This will be explained in more detail below.

By returning exhaust to the cylinder 2, so-called Exhaust Gas Recirculation or EGR, the formation of $NO_x$ can be reduced. This, however, occurs at the cost of soot particle formation. By combining exhaust gas recirculation with injection pauses in accordance with the present process, the soot particle content in the engine exhaust can be kept under legal limits. At the same time, the amount of recirculated exhaust required is reduced since the initial injection pressure is kept at a relatively low level compared to the last injection pressure. The lower level of the initial injection pressure supplies a smaller amount of mixing energy to the combustion, which lowers the combustion temperature and thereby also the formation of $NO_x$. The injection pause itself can also result in local effects and reduce $NO_x$-emissions.

Under certain operating conditions, the injection with one or more injection pauses $U_i$ according to the invention can result in increased fuel consumption. In order to minimize this effect, the injection pauses should be optimized, contain as little fluid as possible and allow the fluid to combust as rapidly as possible. It has also been shown that the effect of injection pauses are, inter alia, controlled by the geometry of the cylinder and the piston. The higher the injection pressure is at the beginning of the injection after an injection pause, the less fuel is needed to achieve the required mixing. The higher the injection pressure is at the beginning of the injection after an injection pause, the more rapid will be the combustion of the injected fluid. In this case, however, consideration must be taken to the $NO_x$-formation, as described previously.

Furthermore, it is possible to optimize the engine according to the invention taking into account the various load situations. For example, common single injections can be used at low load and injection with at least one pause at high load.

One method of increasing the efficiency of an engine without sharply increasing the formation of $NO_x$, is to increase the amount of recirculated exhaust at the same time as the injection times for the fluid are advanced. This process leads, however, to increased soot particles in the exhaust. In order to avoid these high soot particle contents, an injection pause in fluid injection is made, in order to achieve cleaner exhaust, but with negligible or no increased fuel consumption. Large amounts of recirculated exhaust result, however, in a more complex engine and combustion process. Furthermore, optimization of the injection pauses for the purpose of achieving low fuel consumption can result in increased soot emissions. Therefore, it can be advantageous to only use injection pauses at operational points where fuel consumption is of less importance.

High altitude driving gives rise to smoke problems due to the thin air. Since this is a seldom occurring operating situation, it is possible in this case to counteract soot particle formation with one or more injection pauses, which have been optimized for maximum counteracting of soot particle formation.

Transients, in particular rapid throttle opening, also give rise to problems with high soot particle content in the exhaust. These arise due to the fact that the turbo does not have time to increase the supercharging to the high load level. A relatively long time can pass before there is reached a satisfactory level for the supercharging for the new load condition. In the meantime, the engine operates with a lower air supply than is desirable. In order for the air surplus not to be too low, the load derivative is limited by the engine control system, so that the turbo will have time to reach the desired rpm.

Injection pauses $U_i$ have a number of advantages for throttle opening. Since the injection pauses $U_i$ with subsequent injections contribute to increased oxidation of soot particles, a lower air surplus can be compensated for. The engine control system can compensate the load to the desired higher level more rapidly. The result is an engine which responds more quickly when the throttle is open. The lower efficiency with injection pauses $U_i$ in its basic configuration involves more energy being imparted to the turbo, which thereby more rapidly reaches the desired rpm, which results in more rapid engine response to throttle opening.

The process according to the invention is applicable to two-stroke engines and four-stroke engines and to engines with still more strokes. If the engine is a free-piston engine, the above mentioned angles can be related to a distance which the piston moves in the cylinder or to a corresponding particular point in time.

Only diesel fuel has been mentioned above as a fluid. It is, however, possible to use other combustible and non-combustible fluids, such as gasoline and/or water. It is also conceivable to introduce a fluid in the form of a gas through the injection nozzle 4.

What is claimed is:

1. Method of controlling the injection of fluid into an internal combustion engine, comprising a piston reciprocating in a cylinder between top and bottom dead center points, and an injection nozzle arranged in the cylinder, said method comprising the steps of effecting a first injection of fluid with an initial injection pressure into the cylinder when the piston is near top dead center, said fluid being ignited so that the pressure in the cylinder increases, thus causing the piston to be displaced towards the bottom dead center in the cylinder, and effecting at least one injection pause during the injection of fluid, characterized in that a post injection of fluid, immediately after the injection pause, is carried out, when the piston is moving towards bottom dead center, so that the initial pressure is increased in an interval of more than 200 bar and up to 2000 bar relative to an injection pressure prevailing immediately prior to the injection pause and that the injection pause is effected for a duration corresponding to an angle of rotation of a crankshaft arranged in an engine, in the interval of more than 3° and up to 30°.

2. Method according to claim 1, characterized in that an injection valve (20) is provided with an injection needle (27), designed to cooperate with at least an injection opening (17) arranged in an injection nozzle (4), said injection needle (27) being controlled by the fluid pressure generated by a high-pressure pump (22), said fluid pressure in turn being affected by a spill valve (31) arranged in the injection valve (20), said spill valve, when opening, lowering the pressure in the injection valve (20) and where the injection needle (27) can also be opened and closed by a control arrangement (35) independent of the fluid pressure generated.

3. Method according to claim 2, characterized in that the injection valve (20) is of unit injector type.

4. Method according to claim 1, characterized in that injection pauses ($U_i$) are only effected when excessive amounts of soot appear during the combustion of the fluid in the cylinder (2).

5. Method according to claim 1, characterized in that injection pauses ($U_i$) are only effected when the amount of air drawn into the engine (1) contains a comparatively small amount of oxygen molecules per unit of volume drawn in.

6. Method according to claim 1, characterized in that injection pauses ($U_i$) are only effected when operating the engine (1) during transient sequences.

7. Method according to claim 1, characterized in that prior to the first injection pause ($U_i$), the fluid is injected into the cylinder (2) in the form of a cone, with a first cone angle ($\beta1$) relative to the centerline (15) of the cylinder (2) and that subsequent injections of fluid into the cylinder (2) are effected in the form of a cone, with a second cone angle ($\beta2$) relative to the centerline (15) of the cylinder (2).

8. Method according to claim 1, characterized in that a smaller amount of recirculated exhaust is supplied to the internal combustion engine (1) than what would normally be required to reduce the amount of $NO_x$— emissions to a certain level.

9. The method of claim 1, wherein the injection pause ($U_i$) is effected for a duration corresponding to an angle of rotation ($\alpha$) of a crankshaft (10) arranged in the engine (1), in the interval of more than 3° and up to 20°.

* * * * *